US010552541B1

(12) United States Patent
Dreher et al.

(10) Patent No.: US 10,552,541 B1
(45) Date of Patent: Feb. 4, 2020

(54) PROCESSING NATURAL LANGUAGE QUERIES BASED ON MACHINE LEARNING

(71) Applicant: International Business Machines Corporation, Armonk, NY (US)

(72) Inventors: Brian S. Dreher, San Jose, CA (US); Henry H. Chen, Austin, TX (US); Sheng Hua Bao, San Jose, CA (US); William S. Spangler, San Martin, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/113,390

(22) Filed: Aug. 27, 2018

(51) Int. Cl.
*G06F 17/20* (2006.01)
*G06F 17/27* (2006.01)
*G06N 20/00* (2019.01)

(52) U.S. Cl.
CPC ...... *G06F 17/2785* (2013.01); *G06F 17/2795* (2013.01); *G06N 20/00* (2019.01)

(58) Field of Classification Search
CPC .. G06F 17/2785; G06F 17/2795; G06N 20/00
USPC ........................................ 704/8, 9, 257, 275
See application file for complete search history.

(56) References Cited

U.S. PATENT DOCUMENTS

| 8,782,069 | B2 | 7/2014 | Jockish et al. |
| 9,235,846 | B2 | 1/2016 | Petschulat et al. |
| 9,240,016 | B2 | 1/2016 | Cronin et al. |
| 9,672,299 | B2 | 6/2017 | Gibson |
| 2005/0033569 | A1* | 2/2005 | Yu .......................... G06F 17/276 704/10 |
| 2008/0133244 | A1* | 6/2008 | Bodin ..................... G10L 15/22 704/275 |
| 2009/0030696 | A1* | 1/2009 | Cerra ..................... G10L 15/183 704/275 |
| 2014/0279993 | A1* | 9/2014 | Bernhardt ........... G06F 16/3322 707/706 |
| 2018/0190279 | A1* | 7/2018 | Anderson ............... G10L 15/22 |

OTHER PUBLICATIONS

Ma et al., "Esearch: Incorporating Text Corpus and Structured Knowledge for Open Domain Entity Search", International World Wide Web Conference Committee, WWW 2017 Companion, Apr. 2017, pp. 253-256.

(Continued)

*Primary Examiner* — Thierry L Pham
(74) *Attorney, Agent, or Firm* — Ryan Lewis; Edell, Shapiro & Finnan, LLC (57) ABSTRACT

According to an embodiment of the present invention, a natural language query including an ambiguous entity is received from a user. A meaning of the ambiguous entity is determined based on an extracted language context of the natural language query. The determined meaning, extracted language context, and contextual information of the user is applied to a machine learning model to determine a plurality of computer applications from amongst multiple computer applications to process the natural language query. The determined applications are executed to produce results for the natural language query tailored to an interest of the user in accordance with the contextual information.

20 Claims, 8 Drawing Sheets

(56) References Cited

OTHER PUBLICATIONS

Anonymously, "Method and System for Conversational System Configuration Using Machine Reading and Dialog", http://ip.com/IPCOM/000251873D, Dec. 7, 2017, 5 pages.

Anonymously, "A method and system a Smart Conversational System for dynamic response based on the User's context and queries tailored with User demographic information", http://ip.com/IPCOM/000249562D, Mar. 3, 2017, 5 pages.

Anonymously, "A method to help user build query more efficiently and verify the correctness of built query easily", http://ip.com/IPCOM/000237176D, Jun. 6, 2014, 9 pages.

Anonymously, "On-the-fly visualization of value distributions for SQL queries", http://ip.com/IPCOM/000216059D, Mar. 21, 2012, 8 pages.

* cited by examiner

```
{
  "input":{
    "limit":"1000000",
    "threshold":1,
    "include_types":["GENE"],
    "confidence":0,
    "include_direct":false,
    "relationship_endingnode":[],
    "relationship_startingnode":[],
    "relSources":{
      "BIORELS":["PTM","NONPTM","OTHER","UNCONSTRAINED"],
      "SCORES":["NMF"],
      "CURATEDRELS":["CHEMICAL-CONDITION","CHEMICAL-GENE","DRUG-CONDITION","DRUG-GENE"]},
      "relFilters":{
        "BIORELS":{"PTM":{"datasource":"v_2014_bundle"},
        "NONPTM":{"datasource":"v_2014_bundle"},
        "OTHER":{"datasource":"v_2014_bundle"},
        "UNCONSTRAINED":{"datasource":"v_2014_bundle"}
      }
    },
    "relationship":"phosphorylation",
    "query":null,
    "queryIds":null,
    "entities":[
      {"name":"CDK1","type":"GENE","displayName":"CDK1"},
      {"name":"CDK2","type":"GENE","displayName":"CDK2"}
    ],
    "countsOnly":false
  }
}
```

PROCESSING NATURAL LANGUAGE QUERIES BASED ON MACHINE LEARNING

BACKGROUND

Technical Field

The present disclosure relates to processing of natural language queries and, more specifically, to processing a natural language query by applying machine learning to features of the query and contextual information related to a user to select appropriate applications to retrieve and/or visualize results for the query.

Discussion of Related Art

A natural language query may include an ambiguous entity (e.g., an entity associated with a plurality of meanings or definitions), such as a term or acronym for which a definition depends upon a user context. A conventional search engine will return search results relating to all possible interpretations/definitions of the ambiguous entity.

For example, in biology, the TP53 gene provides instructions for making a tumor suppressing protein p53. Susceptibility to basal cell carcinoma (BCC7) is influenced by variation in the TP53 gene. ERK1 and ERK2 are enzymes that, in humans, are related to various cellular processes, including proliferation. A user, such as a cancer researcher, may construct a natural language query: "what is TP53?" In response to the query, a conventional search engine may return information related to basal cell carcinoma, gene TP53, tumor protein p53, ERK1, ERK2, and/or wholly unrelated subject matter, such as a rechargeable battery and/or a 3-D computer program. The user thus has to sort through the results to identify results that are relevant to the user.

SUMMARY

In an embodiment of the present invention, a natural language query including an ambiguous entity is received from a user. A meaning of the ambiguous entity is determined based on an extracted language context of the natural language query. The determined meaning, extracted language context, and contextual information of the user are applied to a machine learning model to determine a plurality of computer applications from amongst multiple computer applications to process the natural language query. The determined applications are executed to produce results for the query tailored to an interest of the user in accordance with the contextual information.

BRIEF DESCRIPTION OF THE DRAWINGS

Generally, like reference numerals in the various figures are utilized to designate like components.

DETAILED DESCRIPTION

Figure 1:
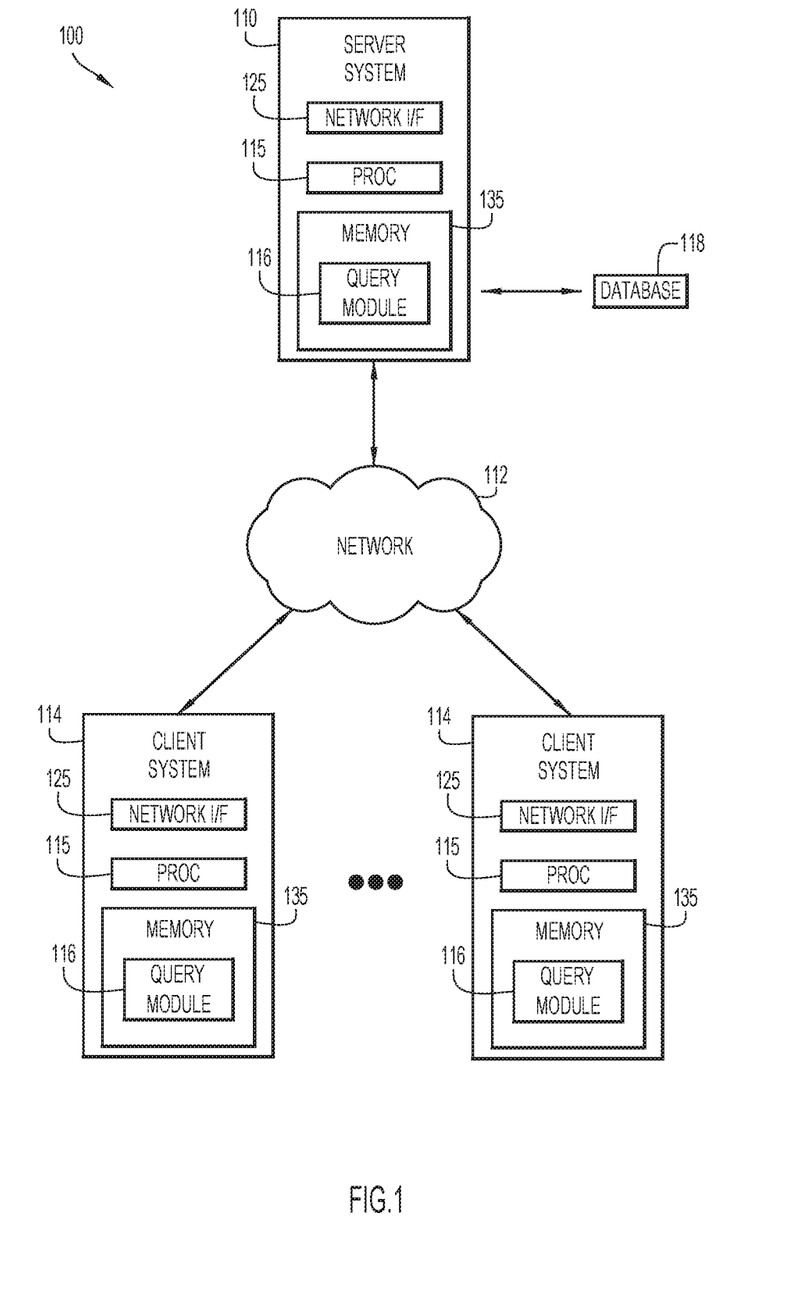
FIG. 1 illustrates an example environment in which techniques disclosed herein may be implemented or configured, in accordance with an embodiment of the present invention.

FIG. 1 illustrates an example environment 100 in which techniques disclosed herein may be implemented or configured.

Environment 100 includes one or more server systems 110, and one or more client or end-user systems 114. Server systems 110 and client systems 114 may be remote from each other and communicate over a network 112. The network may be implemented by any number of any suitable communications media (e.g., wide area network (WAN), local area network (LAN), Internet, Intranet, etc.). Alternatively, server systems 110 and client systems 114 may be local to each other, and communicate via any appropriate local communication medium (e.g., local area network (LAN), hardwire, wireless link, Intranet, etc.).

Client systems 114 may be configured to perform local functions (e.g., within the respective client system 114), and/or to interact with other client systems 114 and/or server systems 110, such as to send and/or receive data and/or instructions.

Server system 110 includes a query module 116 to analyze a natural language input or query and process the query by selecting and executing one or more corresponding applications with which to process the natural language input or query based on the analysis as described below.

A database system 118 may store various information for the analysis. The database system may be implemented by any conventional or other database or storage unit, may be local to or remote from server systems 110 and client systems 114, and may communicate via any appropriate communication medium (e.g., local area network (LAN), wide area network (WAN), Internet, hardwire, wireless link, Intranet, etc.). Client systems 114 may present a graphical user (e.g., GUI, etc.) or other interface (e.g., command line prompts, menu screens, etc.), to elicit information from users pertaining to a desired task.

Server systems 110 and client systems 114 may be implemented by any conventional or other computer systems preferably equipped with a display or monitor, a base (e.g., including at least one hardware processor 115 (e.g., microprocessor, controller, central processing unit (CPU), etc.), one or more memories 135 and/or internal or external network interfaces or communications devices 125 (e.g., modem, network cards, etc.)), optional input devices (e.g., a keyboard, mouse or other input device), and any commercially available and custom software (e.g., server/communications software, query module, browser/interface software, etc.).

Alternatively, one or more client systems 114 may be configured to operate in a stand-alone mode. In the stand-alone mode of operation, a client system 114 stores or has access to data (e.g., database 118), and includes a query module 116 to analyze natural language input and to select and execute one or more applications with which to process the natural language input based on the analysis as described below.

The graphical user (e.g., GUI, etc.) or other interface (e.g., command line prompts, menu screens, etc.), may be configured to receive the natural language input or query from a user.

Query module 116 may include one or more modules or units to perform various functions of present invention embodiments disclosed herein. The various modules may be implemented by any combination of any quantity of software (e.g., a computer program product), and/or hardware modules or units, and may reside within memory 135 of the server and/or client systems for execution by processor 115.

It will be appreciated that the embodiments described herein and illustrated in the drawings represent only a few of the many ways of processing a natural language query.

Environment 100 may include any number of computer or other processing systems (e.g., client or end-user systems, server systems, etc.) and databases or other repositories arranged in any desired fashion, where techniques disclosed herein may be applied to any desired type of computing environment (e.g., cloud computing, client-server, network computing, mainframe, stand-alone systems, etc.).

The computer or other processing systems employed may be implemented by any number of any personal or other type of computer or processing system (e.g., desktop, laptop, PDA, mobile devices, etc.), and may include any commercially available operating system and any combination of commercially available and custom software (e.g., browser software, communications software, and/or server software). These systems may include any types of monitors and input devices (e.g., keyboard, mouse, voice recognition, etc.) to enter and/or view information.

It is to be understood that a computer program to process natural language inputs or queries, such as described in one or more examples herein, may be implemented in any desired computer language by one of ordinary skill in computer arts based on the descriptions provided herein and the drawings. Further, any references herein of a computer program performing various functions generally refer to computer systems or processors performing those functions based on instructions contained in the computer program. The computer systems may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, functions may be distributed in any manner among the various end-user/client and server systems, and/or any other intermediary processing devices. Techniques disclosed herein may be modified in any manner that accomplishes the functions described herein. In addition, functions/features disclosed herein may be performed in any order that accomplishes a desired operation.

A computer program may be provided/encoded on a non-transitory computer readable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information. The database system may be implemented by any number of any conventional or other databases, data stores or storage structures (e.g., files, databases, data structures, data or other repositories, etc.) to store information. The database system may be included within or coupled to the server and/or client systems. The database systems and/or storage structures may be remote from or local to the computer or other processing systems, and may store any desired data.

Methods and systems disclosed herein may employ any number of any type of user interface (e.g., Graphical User Interface (GUI), command-line, prompt, etc.) to obtain or provide information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

Figure 2:
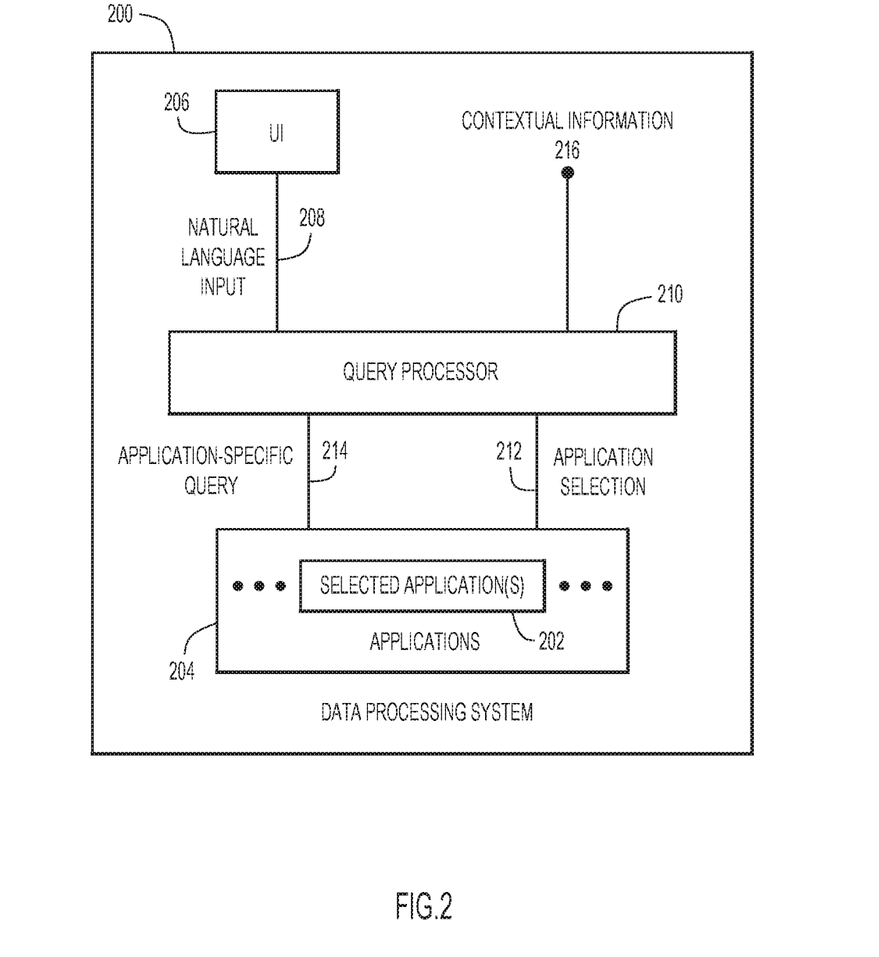
FIG. 2 is a block diagram of a data processing system configured to process natural language user input, in accordance with an embodiment of the present invention.

FIG. 2 is a block diagram of a data processing system (system) 200, configured to process a natural language user input or query 208. The query is processed by query processor 210 that analyzes the natural language query to extract features, applies the extracted features to a machine learning model to select one or more of multiple applications 204, and executes the selected applications to process the query. System 200 may represent an example embodiment of server system 110 or a client system 114 in FIG. 1.

System 200 includes a user interface (UI) 206, to receive a natural language input or query 208. UI 206 may include, without limitation, a microphone, a touch-sensitive display, a keyboard (physical and/or virtual), and/or a pointing device to receive the natural language query in various corresponding forms (e.g., text, voice signals, etc.). The voice signals may be converted to text for processing of the natural language query via various conventional or other speech-to-text conversion techniques.

System 200 further includes query processor 210 to process the query and select one or more applications 202 from amongst applications 204 based on an analysis of natural language input or query 208. Query processor 210 may be configured to provide an application selection 212 to launch or execute the selected applications 202. Applications 204 may include, without limitation, search engines, query refinement tools, and/or display/visualization applications. Applications 204 may include any commercially available and/or custom applications (e.g., an off-the-shelf application, a proprietary application, etc.). For example, applications 204 may include search engines for various different data sources (e.g., ontologies, documents, dictionaries, network or Internet documents, etc.), visualization applications to provide different types of visualizations (e.g., graphs, charts, etc.), and query refinement tools (e.g., to augment a query with synonyms, additional descriptive terms, etc.).

Query processor 210 may be further configured to construct or format an application-specific query 214 for a selected application 202 based on natural language input 208 and requirements of application 202. The application specific-query may be constructed based on an analysis of the natural language query and be compatible with application programming interfaces (API) of the selected applications as described below.

In an embodiment, query processor 210 is configured to select one or more application 202 and/or to format application-specific query 214 further based on contextual information 216. Contextual information 216 may include information related to a user, such as, without limitation, an indication of an application that is currently in-use by the user, information from social media sites, information from a user profile (e.g., interests, job title, occupation, educational background, etc.). For example, an ambiguous entity within the natural language input may be resolved based on this contextual information to provide an interpretation corresponding to the user. The interpreted meaning may be used to select corresponding applications to search appropriate data sources (e.g., Internet documents, medical literature, ontologies, etc.) and provide corresponding visualizations. By way of example, a search or query provided by an orthopedist for an entity of "arm" may enable selection of applications for searching of data sources pertaining to orthopedics, whereas a similar search by a dermatologist may enable selection of applications for searching of data sources pertaining to dermatology based on the contextual information of the user. This enables processing of the natural language query to provide results of interest to the user.

In addition, since the application specific queries and searches are focused to only those data sources and information of interest, faster query processing speed is achieved with more accurate results thereby conserving resources and improving the functioning of the computer. For example, a user may construct a natural language query: "what is TP53?" In response to the query, a conventional search engine may search numerous data sources and documents and return information related to basal cell carcinoma, gene TP53, tumor protein p53, ERK1, ERK2, and/or wholly unrelated subject matter, such as a rechargeable battery and/or a 3-D computer program. This consumes significant processing time and wastes resources since several unnecessary applications may be executed and/or many data sources with unrelated information may be searched.

In contrast, present invention embodiments analyze the natural language query (e.g., for context and meaning) and focus the search to specific sources and/or specific information. Present invention embodiments determine an appropriate combination (and quantity) of applications that search specific terms and/or data sources to provide results each preferably of interest to the user. This provides results with greater accuracy and consumes less processing resources (since processing is utilized (or applications executed) for only those sources having relevant information).

Figure 3:
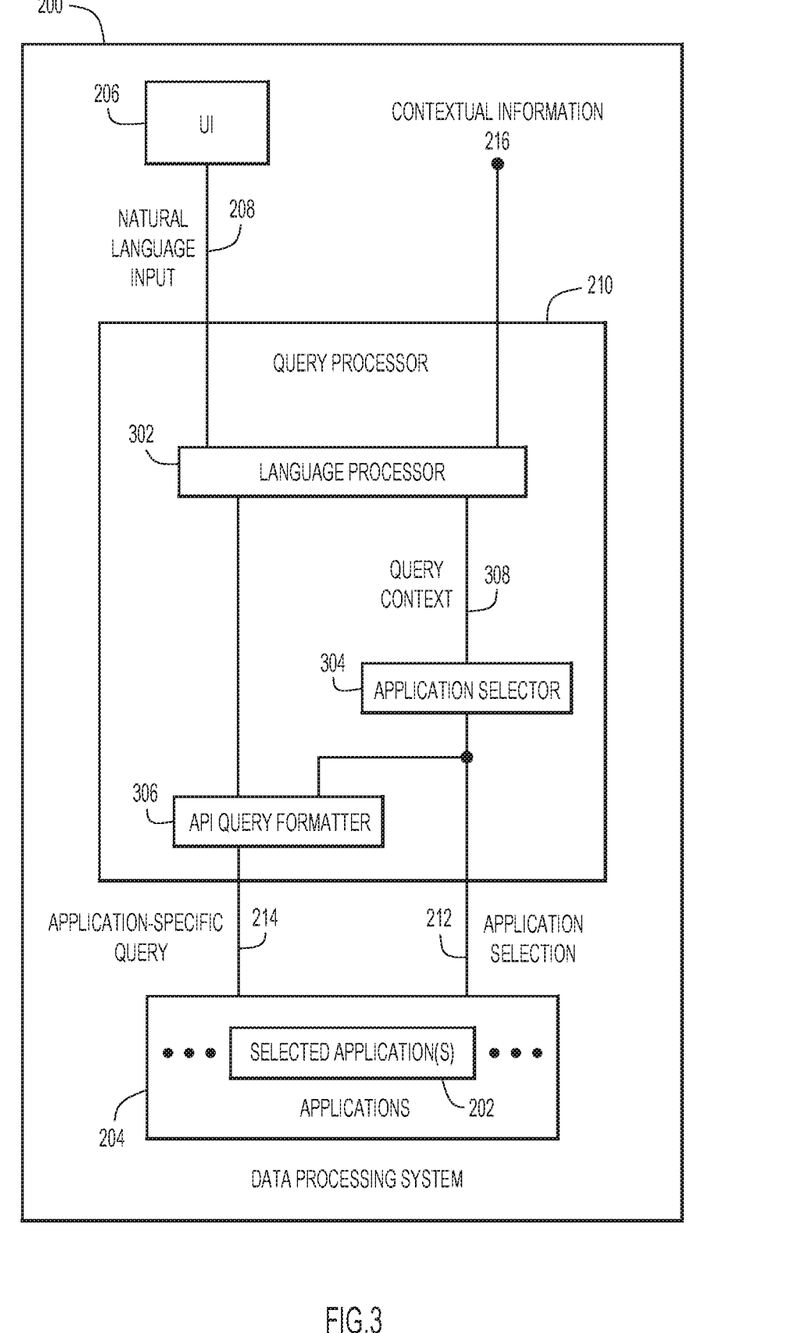
FIG. 3 is a block diagram of an example embodiment of the system of FIG. 2, in which a query processor of FIG. 2 includes a language processor, an application selector, and an application programming interface (API) query formatter, in accordance with an embodiment of the present invention.

FIG. 3 is a block diagram of an example embodiment of system 200, in which query processor 210 includes a language processor 302, an application selector 304, and an application programming interface (API) query formatter 306.

Language processor 302 is configured to extract language context from natural language input or query 208. Language processor 302 may be configured to extract the language context from natural language input or query 208 based in part on contextual information 216. The language processor may employ various conventional or other natural language processing techniques (e.g., entity detection, relationship detection, parts of speech tagging, annotators, contextual analysis, semantic analysis, etc.) to analyze the natural language query and extract the language context. The language context may include content of the natural language input or query, identification of entities, meanings of ambiguous entities, relationships between entities, etc. Query context 308 may include the language context alone or in combination with contextual information 216 of the user. The query context may include various features, such as a user context, meanings of ambiguous entities, relationships between entities, synonyms or related terms of the entities, etc. The relationships, entities, and synonyms may be determined based on various ontologies, dictionaries, and/or publications (e.g., subject matter literature, etc.) containing entities.

Application selector 304 is configured to select one or more applications 202 based on query context 308. The application selector preferably employs a machine learning model to determine the appropriate applications to process the natural language query. For example, application selector 304 may include a machine learning model that is trained to correlate query context 308 to selectable ones of applications 204. In an embodiment, the machine learning model is trained to correlate a training set of natural language input or queries 208 (e.g., query context 308 derived from up to thousands of natural language questions or queries) to selected applications 204. Alternatively, or additionally, the machine learning model may be trained in real-time based on natural language input or query 208 of a user, and applications 204 selected by the user to process the natural language input 208 of the user. Application selector 304 may employ various machine learning models to perform the machine learning (e.g., neural networks, mathematical/statistical models, classifiers, etc.).

For example, a machine learning classification model may be utilized to determine which applications (or the appropriate combination of applications) to use to produce results of interest to the user. Based on a sample of various known questions (e.g., 1000 or any other sample size of questions or queries) that can be handled by existing applications, a machine learning model is constructed to predict which applications should be selected for a new question. The machine learning model is trained on the sample set, and may be trained based on language context alone or in combination with contextual information 216 within query context 308. For example, user interests, occupation, or educational background may assist in determining the meaning of ambiguous entities in the natural language query, the type of search/data source, and/or visualization to employ, and the corresponding applications to select. The language context of the new question (e.g., either alone or in combination with contextual information 216 of the user in query context 308) is applied to the machine learning model to determine the appropriate applications for the natural language query.

API query formatter 306 is configured to format application-specific query 214 based on query context 308 (e.g., the language context alone or in combination with contextual information 216) and requirements of selected application 202. The API query formatter utilizes the key elements/entities/relationships from the query context of the natural language query and converts the natural language query to formats compatible with the APIs of the selected applications as described below (e.g., FIG. 5).

API query formatter 306 may be configured to expand natural language input or query 208 based on query context 308 (e.g., the language context alone or in combination with contextual information 216) to encompass one or more of a variety of features. For a given entity or entities extracted from natural language input or query 208, API query formatter 306 may be configured to expand natural language input or query 208 to ask one or more of:
  what is the entity?;
  what is related to the entity?;
  what is the relationship between the entity and another entity?;
  what other entity is most relevant to the entity?;
  show evidence regarding the entity?;
  what genes are potentially related to the medical condition?; and
  what are the most relevant drugs related to the entity?

API query formatter 306 is not, however, limited to the foregoing examples.

Figure 4:
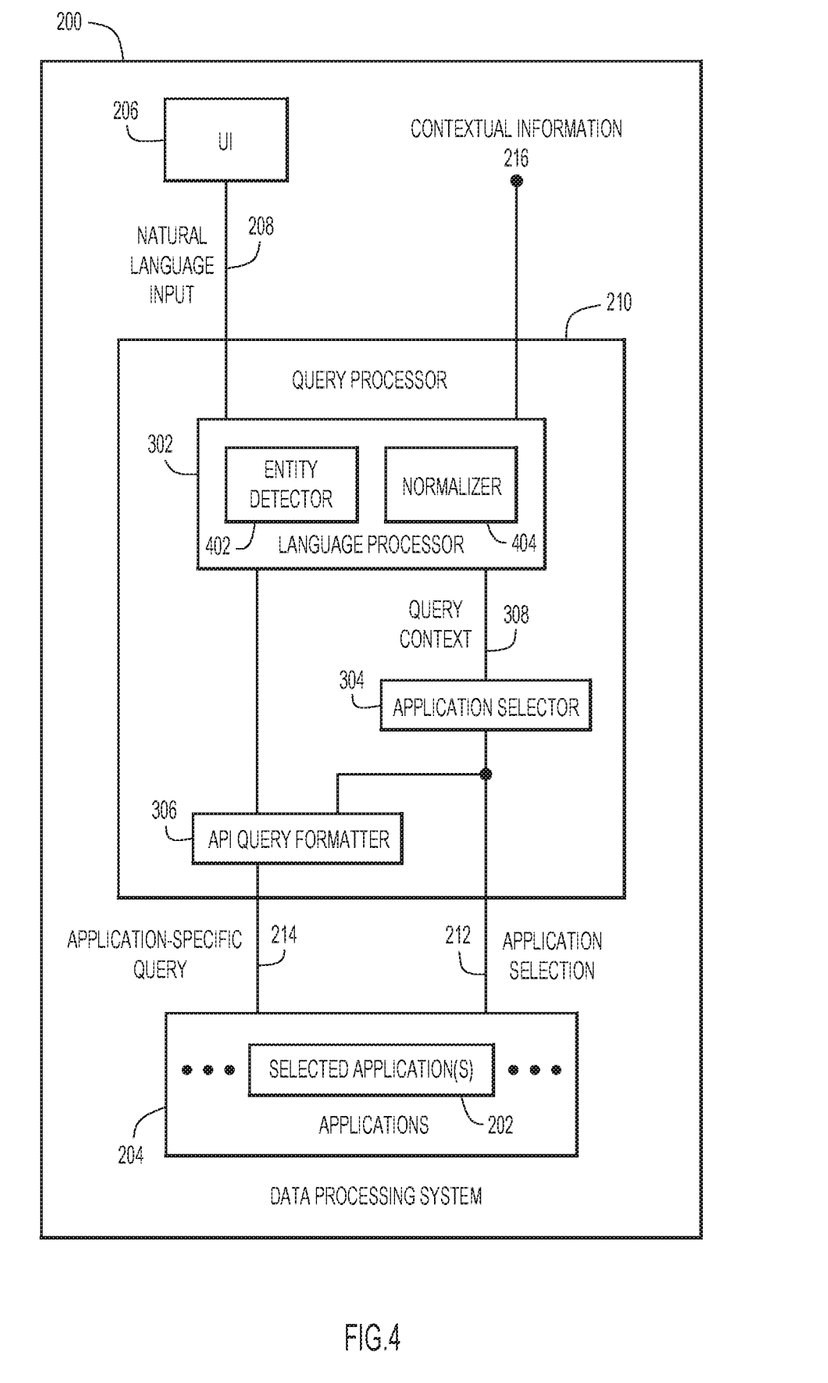
FIG. 4 is a block diagram of another example embodiment of the system of FIG. 2, in which the language processor of FIG. 3 includes an entity detector and a normalizer, in accordance with an embodiment of the present invention.

FIG. 4 is a block diagram of another example embodiment of system 200, in which language processor 302 includes an entity detector 402 and a normalizer 404.

Entity detector 402 is configured to detect and/or determine one or more entities of natural language input or query 208. An entity may include, without limitation, a term, an acronym, a noun, a pronoun, a gerund, and/or a clause. In an embodiment, natural language input or query 208 includes an ambiguous entity (e.g., an entity associated with a plurality of meanings), and language processor 302 is configured to determine a meaning of the ambiguous entity based on features of natural language input or query 208, alone and/or in combination with contextual information 216. The entity detector may utilize various ontologies, dictionaries, and/or publications (e.g., subject matter literature, etc.) to detect entities (and entity relationships) within the natural language query.

Normalizer 404 is configured to normalize natural language input or query 208. Normalizer 404 may be configured, for example, to determine related terms or phrases of the entity, collectively referred to herein as synonyms of the entity. Normalizer 404 may be configured to normalize natural language input 208 based in part on contextual information 216. The normalizer may utilize various ontologies, dictionaries, and/or publications (e.g., subject matter literature, etc.) to determine the related terms for detected entities within the natural language query.

As an example, and without limitation, natural language input or query 208 may include, "What is the relationship between CDK1 and CDK2?". In this example, language processor 302 may identify entities CDK1 and CDK2, determine that these entities are genes, and identify relationships between the entities (e.g., based on ontologies, dictionaries, and/or publications). Further in this example, application selector 304 may select a search application based on the query context 308 (e.g., the language context alone or in combination with contextual information 216 of the user) and a visualization application to present a visual depiction of one or more relationships amongst the genes. API query formatter 306 may convert the natural language query to a format that is compatible with the API of the selected search and visualization applications. Query formatter 306 may, for example, convert the natural language query to a JavaScript Object Notation (JSON) format compatible with the API for the selected applications.

Figure 5:
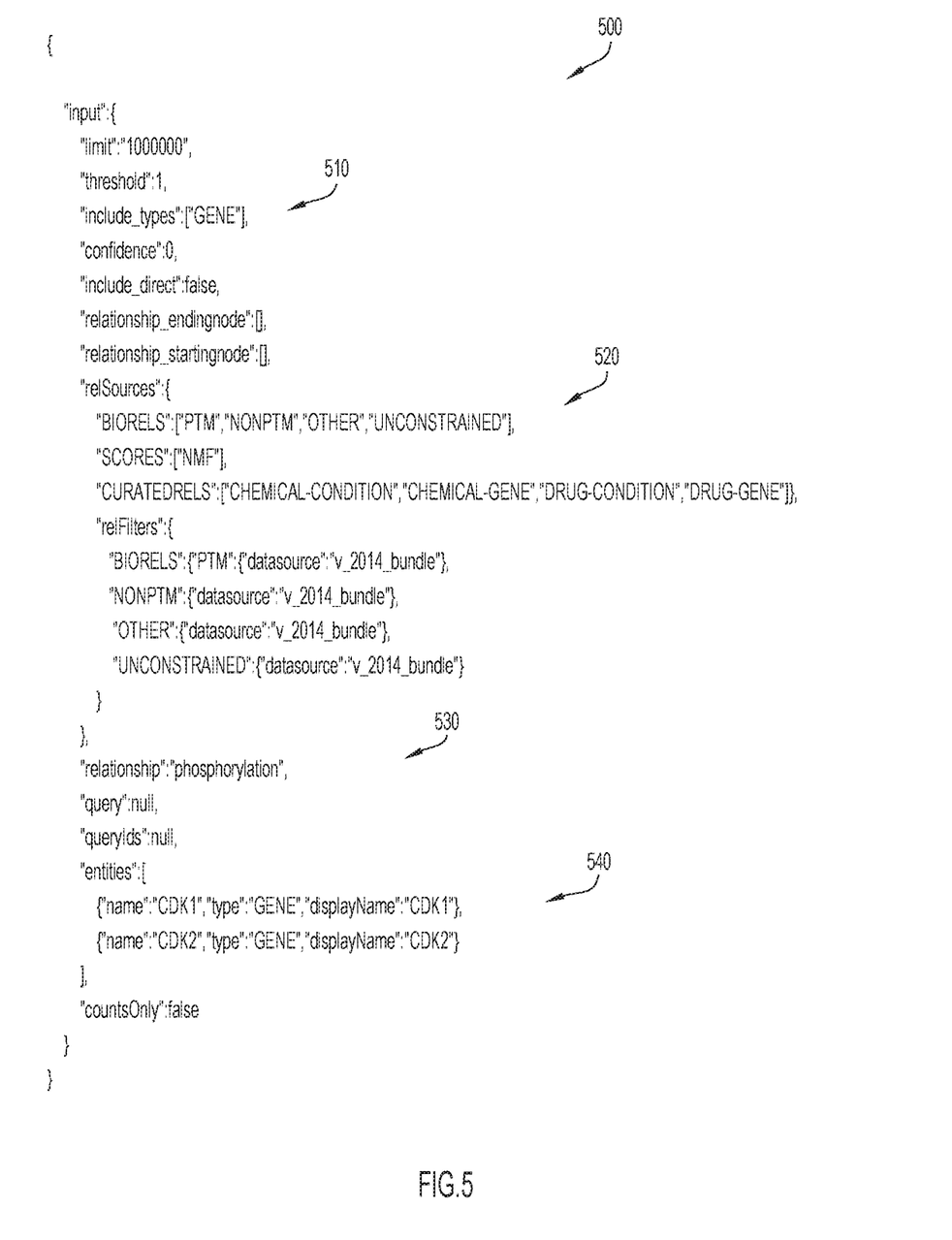
FIG. 5 illustrates an example conversion of a natural language query to an API for a corresponding application processing the query, in accordance with an embodiment of the present invention.
Figure 6:
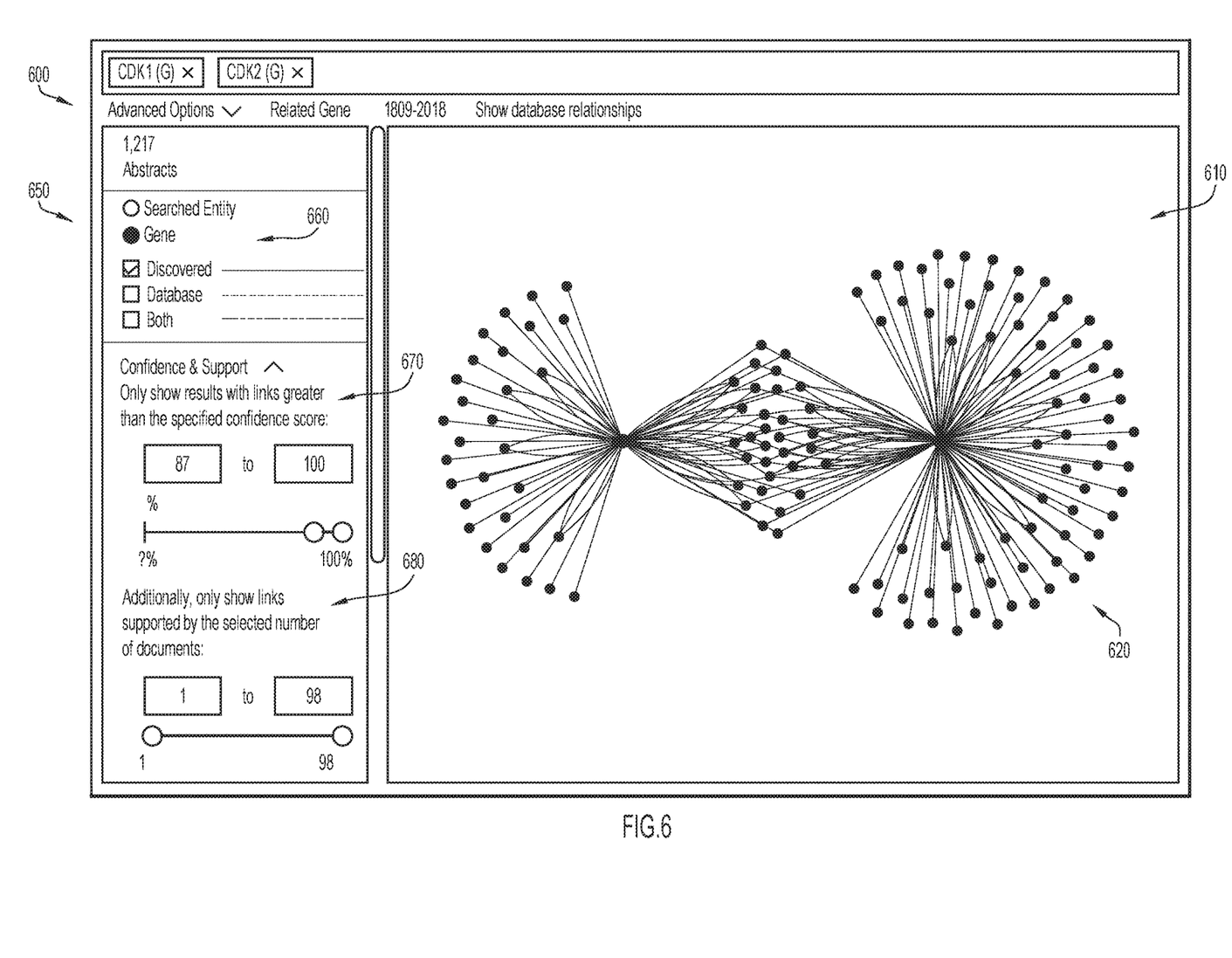
FIG. 6 is an example screen-shot of a visual depiction of relationships amongst genes, as presented by a selected application, in accordance with an embodiment of the present invention.

FIG. 5 illustrates an example JSON object 500 produced from the example natural language query ("What is the relationship between CDK1 and CDK2?") for an API of a visualization application providing the visualization of FIG. 6. By way of example, JSON object 500 includes a type section 510, a sources section 520, a relationship section 530, and an entity section 540. Type section 510 indicates the type (e.g., gene) for the identified entities (e.g., CDK1 and CDK 2). Sources section 520 indicates the sources and filters to produce the information for the visualization. Relationship section 530 indicates a relationship (e.g., phosphorylation) between the entities, while entity section 540 indicates the identified entities, corresponding type, and display name for the entities in the visualization. The visualization is produced for the query in accordance with the information in JSON object 500.

FIG. 6 is an example interface screen 600 of a visual depiction of relationships amongst the genes of the example natural language query as presented by a selected visualization application. Interface screen 600 includes a visualization area 610 and a control area 650. Visualization area 610 provides a graphical representation 620 of relationships between the identified entities (e.g., CDK1 and CDK2). Entities are represented by nodes, while relationships are indicated by links between the nodes. The links may be coded (e.g., solid lines, dashed lines, hybrid lines, etc.) to indicate evidence/basis supporting the indicated relationship. Control area 650 provides controls or filters for the visualization. By way of example, control area 650 includes a relationship filter 660, a confidence filter 670, and a document support filter 680. Each of these filters may be adjusted to provide desired information for the visualization.

Relationship filter 660 indicates the manner of searching the entity (e.g., the entity itself or by type (e.g., gene)) and the type of evidence or basis for relationships (e.g., discovered though analysis, documented in a database, or both). Confidence filter 670 enables results (or relationships) having a confidence within a specified range to be included in the visualization. Document support filter 680 enables results (or relationships) supported by a specified number of documents to be included in the visualization. Each of these filters may be adjusted, where the visualization is dynamically updated to provide the desired information for the visualization.

System 200, as described with reference to FIG. 2, FIG. 3, and/or FIG. 4, may be useful in one or more of a variety of situations. Additional examples are provided below with respect to biology. Methods and systems disclosed herein are not, however, limited to biology.

As described further above, the TP53 gene provides instructions for making a tumor suppressing protein p53. Susceptibility to basal cell carcinoma (BCC7) is influenced by variation in the TP53 gene. ERK1 and ERK2 are enzymes that, in humans, are related to various cellular processes, including proliferation. When using system 200, a researcher may submit natural language query 208 to include: "what is TP53?"

In this example, query processor 210 may detect "TP53" as an entity of the natural language query. Query processor 210 may further determine synonymous terms (e.g., related terms) of the entity to include the following terms: gene, p53, BCC7, ERK1, and ERK2. Query processor 210 may identify the term "what is?" as additional language context of the natural language query.

Query processor 210 may further select one or more applications 202 to process the natural language query based on the entity, the synonymous terms, additional language context, and/or contextual information 216. Query processor 210 may, for example, select a first set of one or more applications to retrieve information based on the natural language query, and may select a second set of one or more applications to present or display the retrieved information to the user. The second set of one or more applications may be configured to present or display textual information and/or diagrammatic information (e.g., 2-dimensional or 3-dimemsional representations of retrieved information).

Query processor 210 may further format application-specific query 214 to include one or more of:
What is TP53?;
What is related to TP53?;
Show me the relationship between TP53 and ERK1;
What is the most relevant entity to TP53 and ERK2;
Show me the evidence about PMIRxxxxx;
What are some genes that are potentially related to breast cancer?;
What are the most relevant drugs related to TP53 and ERK2?

Figure 7:
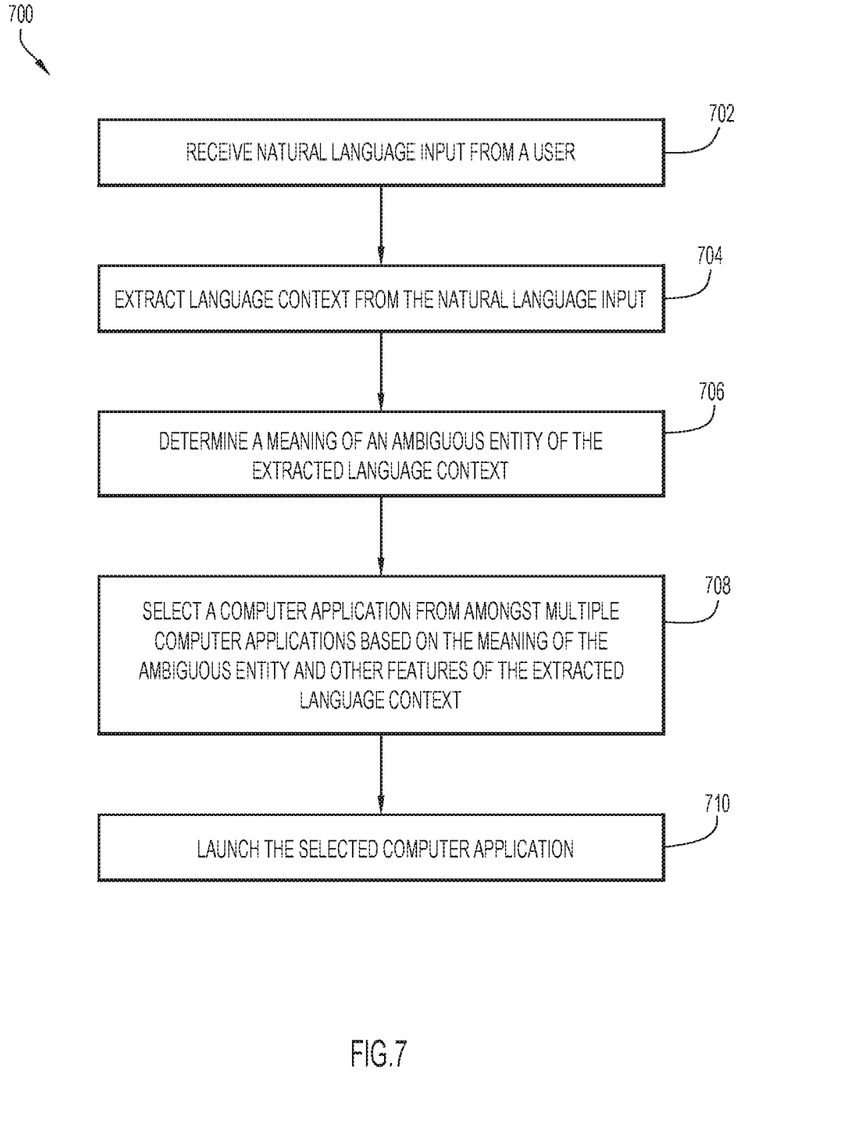
FIG. 7 is a flowchart of a method of processing natural language input, in accordance with an embodiment of the present invention.

FIG. 7 is a flowchart of a method 700 of processing a natural language input or query. Method 700 may be implemented with system 200, as described in one or more examples herein. Method 700 is not, however, limited to system 200.

At operation 702, a natural language input or query is received from a user. Language context is extracted from the natural language input at operation 704.

At 706, a meaning of an ambiguous entity of the extracted language context is determined based on features of the extracted language context, alone and/or in combination with contextual information 216 related to the user.

At 708, one or more computer applications are selected from amongst multiple computer applications based on a combination of the meaning of the ambiguous entity and the other features of the extracted language context that are applied to a machine learning model. The computer applications may be selected based further on the contextual information related to the user which may also be provided to the machine learning model.

At 710, the selected computer applications are launched (e.g., initiated or executed on a processor) to process the natural language input or query. For example, the selected applications may include one or more searching applications and one or more visualization applications. The results from the searching and/or visualization applications are stored and may be made available to any of the successive selected applications to process the query. Application specific queries (or JSON objects) are generated that are compatible with the APIs of the selected applications. This basically forms a chain of applications that can be sequentially executed with resulting data being passed or available to a successive application in the chain. The application specific queries may indicate the location to store results of a currently executed application and/or the location from which to retrieve data produced from a prior executed application. By way of example, the results from the searching applications may be stored and made available to the visualization applications to produce visualizations.

Method 700 may further include determining a synonym of the entity, and the selecting a computer application at 708 may be performed based further on the synonym of the entity. For example, and without limitation, the entity may include a name of a gene, and method 700 may further include determining the synonym to include one or more of a protein expressed by the gene and a medical condition associated with one or more of the gene and the protein.

Method 700 may further include formatting or constructing a query for a selected computer application based on requirements of the selected computer application in combination with the meaning of the entity, a synonym of the entity, other features of the extracted language context, and/or the contextual information related to the user.

Features disclosed herein may be implemented in, without limitation, circuitry, a machine, a computer system, a processor and memory, a computer program encoded in a computer-readable medium, and/or combinations thereof. Circuitry may include, without limitation, discrete and/or integrated circuitry, application specific integrated circuitry (ASIC), a field programmable gate array (FPGA), a system-on-a-chip (SOC), and combinations thereof.

Figure 8:
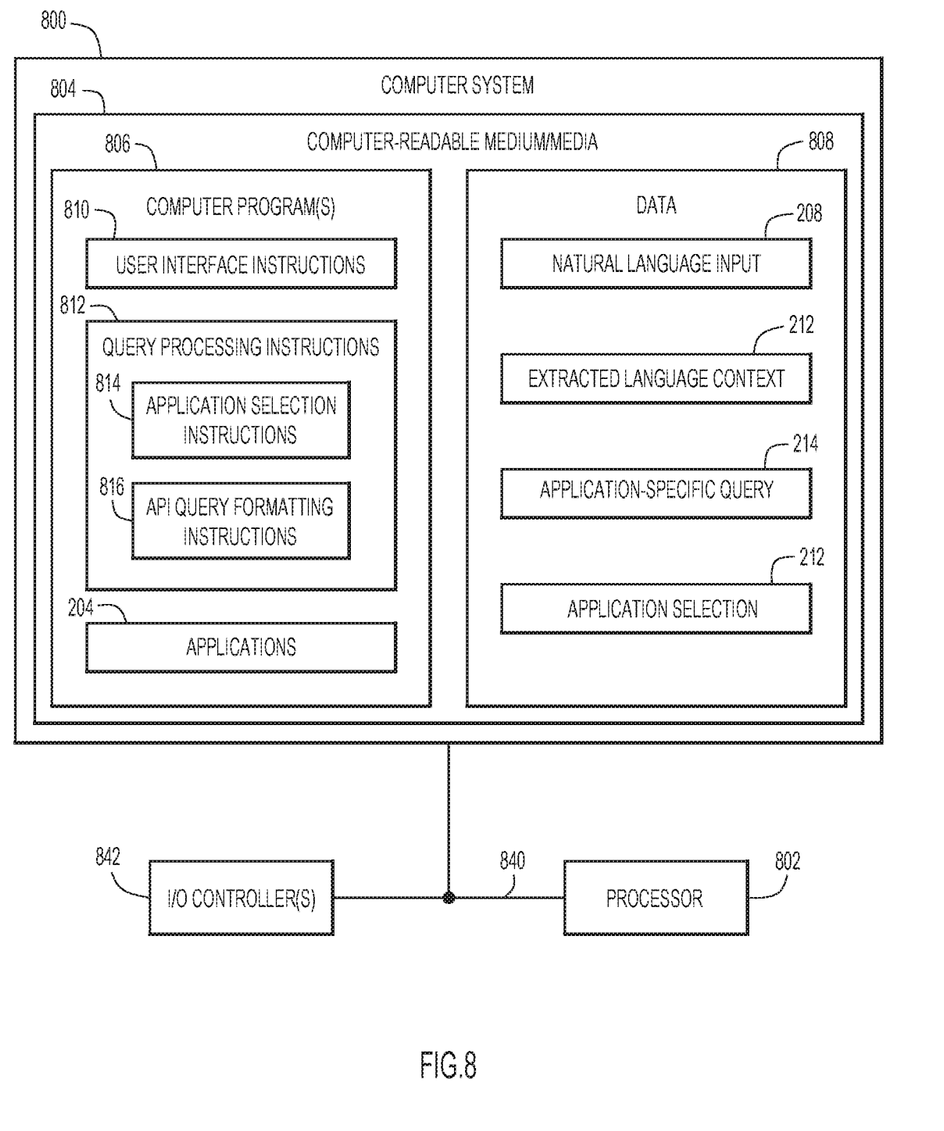
FIG. 8 is a block diagram of computer system configured to process natural language input, in accordance with an embodiment of the present invention.

FIG. 8 is a block diagram of computer system 800, configured to select an application with which to process a natural language input or query. Computer system 800 may represent an example embodiment of server system 110 and/or a client system 114 in FIG. 1, and/or apparatus 200, as illustrated in FIG. 2, FIG. 3, or FIG. 4. Computer system 800 is not, however, limited to the examples of FIG. 1, FIG. 2, FIG. 3, or FIG. 4.

Computer system 800 includes one or more processors, illustrated here as a processor 802, to execute instructions of one or more computer programs 806 encoded within a non-transitory computer-readable medium 804.

Computer-readable medium 804 further includes data 808, which may be used by processor 802 during execution of computer programs 806, and/or generated by processor 802 during execution of computer programs 806.

In the example of FIG. 8, computer programs 806 include user interface instructions 810 to cause processor 802 to receive natural language input or query 208, such as described in one or more examples herein.

Computer programs 806 further include query processing instructions 812 to cause processor 802 to process natural language input or query 208, such as described in one or more examples herein.

Query processing instructions 812 may include application selection instructions 814 to cause processor 802 to select one or more applications 204 with which to process natural language input or query 208, such as described in one or more examples herein.

Query processing instructions 812 may further include API query formatting instructions 816 to cause processor 802 to format or construct an application-specific query 214, such as described in one or more examples herein.

Computer system 800 further includes communications infrastructure 840 to communicate amongst devices of computer system 800.

Computer system 800 further includes an input/output (I/O) controller 842 to communicate between computer system 800 and another apparatus, device, system, and/or network.

Methods and systems disclosed herein are not limited to the specific tasks or algorithms described herein.

Terminology used herein is for the purpose of describing particular embodiments and is not intended to be limiting. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed.

The foregoing description has been presented for purposes of illustration and description, but is not intended to be exhaustive or limited to the form disclosed. Many modifications and variations will be apparent to those of ordinary skill in the art without departing from the scope and spirit of techniques disclosed herein. Embodiments disclosed herein are chosen and described in order to best explain principles and practical applications, and to enable others of ordinary skill in the art to understand the various embodiments with various modifications as are suited to the particular use contemplated.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Techniques disclosed herein may be implemented or configured as a system, a method, and/or a computer program product at any possible technical detail level of integration. The computer program product may include a computer readable storage medium (or media) having computer readable program instructions thereon to cause a processor to carry out features disclosed herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers.

A network adapter card or network interface in each computing/processing device receives computer readable program instructions from the network and forwards the computer readable program instructions for storage in a computer readable storage medium within the respective computing/processing device.

Computer readable program instructions to perform operations disclosed herein may include assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages.

The computer readable program instructions may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Techniques/features are described herein with reference to flowchart illustrations and/or block diagrams of methods, apparatus (systems), and computer program products according to various embodiments. It will be understood that each block of the flowchart illustrations and/or block diagrams, and combinations of blocks in the flowchart illustrations and/or block diagrams, can be implemented by computer readable program instructions.

The computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures.

For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, in a data processing system comprising at least one processor and at least one memory, the at least one memory comprising instructions executed by the at least one processor to cause the at least one processor to select an application to launch on the data processing system, the method comprising:
   receiving a natural language query including an ambiguous entity from a user;
   retrieving contextual information of the user based on an identification of the user;
   determining a meaning of the ambiguous entity based on an extracted language context of the natural language query;
   applying the determined meaning, extracted language context, and the contextual information of the user to a machine learning model to determine a plurality of computer applications from amongst multiple computer applications to process the natural language query, wherein the multiple computer applications include search engines for different data sources, visualization applications to provide different types of visualizations, and query refinement tools; and
   executing the determined computer applications to produce results for the natural language query tailored to an interest of the user in accordance with the contextual information, wherein the determined computer applications include one or more of the search engines to search data sources with data pertaining to the contextual information of the user and a visualization application to provide a visualization in accordance with the results.

2. The method of claim 1, further including:
   constructing queries based on requirements of the determined computer applications in combination with one or more of the meaning of the ambiguous entity, the extracted language context, and the contextual information of the user; and
   submitting the queries to the determined computer applications.

3. The method of claim 1, further including:
   determining a synonym of the ambiguous entity, wherein the extracted language context includes the synonym.

4. The method of claim 3, wherein:
   the ambiguous entity includes a name of a gene; and
   the determining a synonym includes determining the synonym to include one or more of a protein expressed by the gene and a medical condition associated with one or more of the gene and the protein.

5. The method of claim 1, further including training the machine learning model to determine the computer applications to process the natural language query.

6. The method of claim 1, wherein the contextual information includes an indication of an application currently in use by the user.

7. The method of claim 2, wherein each constructed query includes a JavaScript Object Notation (JSON) object.

8. A computer program product comprising a computer readable medium encoded with instructions that, when executed by a processor, cause the processor to:
   receive a natural language query including an ambiguous entity from a user;
   retrieve contextual information of the user based on an identification of the user;
   determine a meaning of the ambiguous entity based on an extracted language context of the natural language query;
   apply the determined meaning, extracted language context, and the contextual information of the user to a machine learning model to determine a plurality of computer applications from amongst multiple computer applications to process the natural language query, wherein the multiple computer applications include search engines for different data sources, visualization applications to provide different types of visualizations, and query refinement tools; and
   execute the determined computer applications to produce results for the natural language query tailored to an interest of the user in accordance with the contextual information, wherein the determined computer applications include one or more of the search engines to search data sources with data pertaining to the contextual information of the user and a visualization application to provide a visualization in accordance with the results.

9. The computer program product of claim 8, further including instructions to cause the processor to:
   construct queries based on requirements of the determined computer applications in combination with one or more of the meaning of the ambiguous entity, the extracted language context, and the contextual information of the user; and
   submit the queries to the determined computer applications.

10. The computer program product of claim 8, further including instructions to cause the processor to:
    determine a synonym of the ambiguous entity, wherein the extracted language context includes the synonym.

11. The computer program product of claim 10, wherein the ambiguous entity includes a name of a gene, and wherein the instructions further cause the processor to:
   determine the synonym to include one or more of a protein expressed by the gene and a medical condition associated with one or more of the gene and the protein.

12. The computer program product of claim 8, further including instructions to cause the processor to:
   train the machine learning model to determine the computer applications.

13. The computer program product of claim 8, wherein the contextual information includes an indication of an application currently in use by the user.

14. The computer program product of claim 9, wherein each constructed query includes a JavaScript Object Notation (JSON) object.

15. An apparatus, comprising, a processor and memory configured to:
   receive a natural language query including an ambiguous entity from a user;
   retrieve contextual information of the user based on an identification of the user;
   determine a meaning of the ambiguous entity based on an extracted language context of the natural language query;
   apply the determined meaning, extracted language context, and the contextual information of the user to a machine learning model to determine a plurality of computer applications from amongst multiple computer applications to process the natural language query, wherein the multiple computer applications include search engines for different data sources, visualization applications to provide different types of visualizations, and query refinement tools; and
   execute the determined computer applications to produce results for the natural language query tailored to an interest of the user in accordance with the contextual information, wherein the determined computer applications include one or more of the search engines to search data sources with data pertaining to the contextual information of the user and a visualization application to provide a visualization in accordance with the results.

16. The apparatus of claim 15, wherein the processor and memory are further configured to:
   construct queries based on requirements of the determined computer applications in combination with one or more of the meaning of the ambiguous entity, the extracted language context, and the contextual information of the user; and
   submit the queries to the determined computer applications.

17. The apparatus of claim 15, wherein the processor and memory are further configured to:
   determine a synonym of the ambiguous entity, wherein the extracted language context includes the synonym.

18. The apparatus of claim 17, wherein the ambiguous entity includes a name of a gene, and wherein the processor and memory are further configured to determine the synonym to include one or more of a protein expressed by the gene and a medical condition associated with one or more of the gene and the protein.

19. The apparatus of claim 15, wherein the processor and memory are further configured to train the machine learning model to determine the computer applications.

20. The apparatus of claim 16, wherein each constructed query includes a JavaScript Object Notation (JSON) object.

* * * * *